(12) United States Patent
Weaver et al.

(10) Patent No.: US 10,494,899 B2
(45) Date of Patent: Dec. 3, 2019

(54) BYPASS VALVE

(71) Applicants: Tommy W. Weaver, Edmond, OK (US); Sydney E. Pogue, Oklahoma City, OK (US)

(72) Inventors: Tommy W. Weaver, Edmond, OK (US); Sydney E. Pogue, Oklahoma City, OK (US)

( * ) Notice: Subject to any disclaimer, the term of this patent is extended or adjusted under 35 U.S.C. 154(b) by 0 days.

(21) Appl. No.: 15/820,024

(22) Filed: Nov. 21, 2017

(65) Prior Publication Data

US 2019/0153812 A1    May 23, 2019

(51) Int. Cl.
*E21B 34/08*  (2006.01)
*E21B 43/12*  (2006.01)
*F16K 15/04*  (2006.01)
*E21B 34/00*  (2006.01)

(52) U.S. Cl.
CPC ............ *E21B 34/08* (2013.01); *E21B 43/126* (2013.01); *F16K 15/04* (2013.01); *E21B 2034/002* (2013.01); *Y10T 137/791* (2015.04); *Y10T 137/7913* (2015.04)

(58) Field of Classification Search
CPC ........... Y10T 137/791; Y10T 137/7913; E21B 34/08; E21B 43/126; E21B 2034/002; F16K 15/04
See application file for complete search history.

(56) References Cited

U.S. PATENT DOCUMENTS

| 2003/0024571 A1* | 2/2003 | Simmons | F16K 15/04 137/329.05 |
| 2009/0194729 A1* | 8/2009 | Weaver | F16K 15/04 251/349 |
| 2012/0227979 A1* | 9/2012 | Simonian | E21B 34/06 166/369 |
| 2014/0116540 A1* | 5/2014 | Waldor | F16K 15/183 137/533.11 |

* cited by examiner

*Primary Examiner* — Marina A Tietjen
*Assistant Examiner* — Frederick D Soski
(74) *Attorney, Agent, or Firm* — Dunlap Codding, P.C.

(57) ABSTRACT

A bypass valve comprising a valve body, a valve member, and a valve seat. The valve body has a first end, a second end, a central axis therebetween, an inlet formed through the first end, a valve channel, and an outlet channel extending from the valve channel to an outer surface of the valve body. The valve channel has a first end in fluid communication with the inlet, a second end terminating within the valve body, and a central channel axis therebetween which is axially aligned with the central axis. The valve member is substantially-spherical and movably disposed within the valve channel. The valve seat is disposed adjacent the first end of the valve channel. The valve seat has an orifice defined therethrough. The valve member is movable between a first position, engaging the valve seat to substantially seal the orifice, and a second position adjacent the second end of the valve channel to permit fluid to flow through the orifice.

13 Claims, 6 Drawing Sheets

BYPASS VALVE

BACKGROUND

Downhole pumps are often used to extract petroleum fluids, such as oil and/or natural gas, from subterranean formations when the natural pressure of an oil or gas formation is insufficient to push the petroleum to the surface. One type of pump is known as a sucker rod pump. Such a sucker rod pump generally includes at least a pump barrel, a plunger that travels up and down within the barrel, a sucker rod actuating the plunger, a standing valve positioned at or near a lower end of the barrel, and a bypass or traveling valve positioned at or near the end of the plunger so as to travel up and down with the plunger.

The valve in these types of downhole pumps typically have a check ball guided in a path by guide rails such as the one disclosed in U.S. Pat. No. 6,830,441 to Williams. In such a valve, the check ball tends to cavitate causing the guide rails to wear away or be beaten out by the check ball. This cavitation happens because the check ball cannot find a single position that is stable. For instance, a change in the position of the check ball causes changes in the fluid flow pattern as the check ball moves to a more stable position, the change in the fluid flow pattern causes cavitation around the check ball which causes the check ball to move, which causes another change in the fluid flow pattern which causes the check ball to move again, and on and on.

In addition, prior valves are plagued by clogging and jamming of the check ball in the open position. This is typically caused by the small size of the passages for fluid and clearance for the check ball present in the current technology.

Therefore, a need exists for a valve that limits cavitation around the check ball and prevents clogging and jamming. It is to such an improved system that the presently disclosed inventive concepts are directed

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION OF EXEMPLARY EMBODIMENTS

Figures 1, 2:
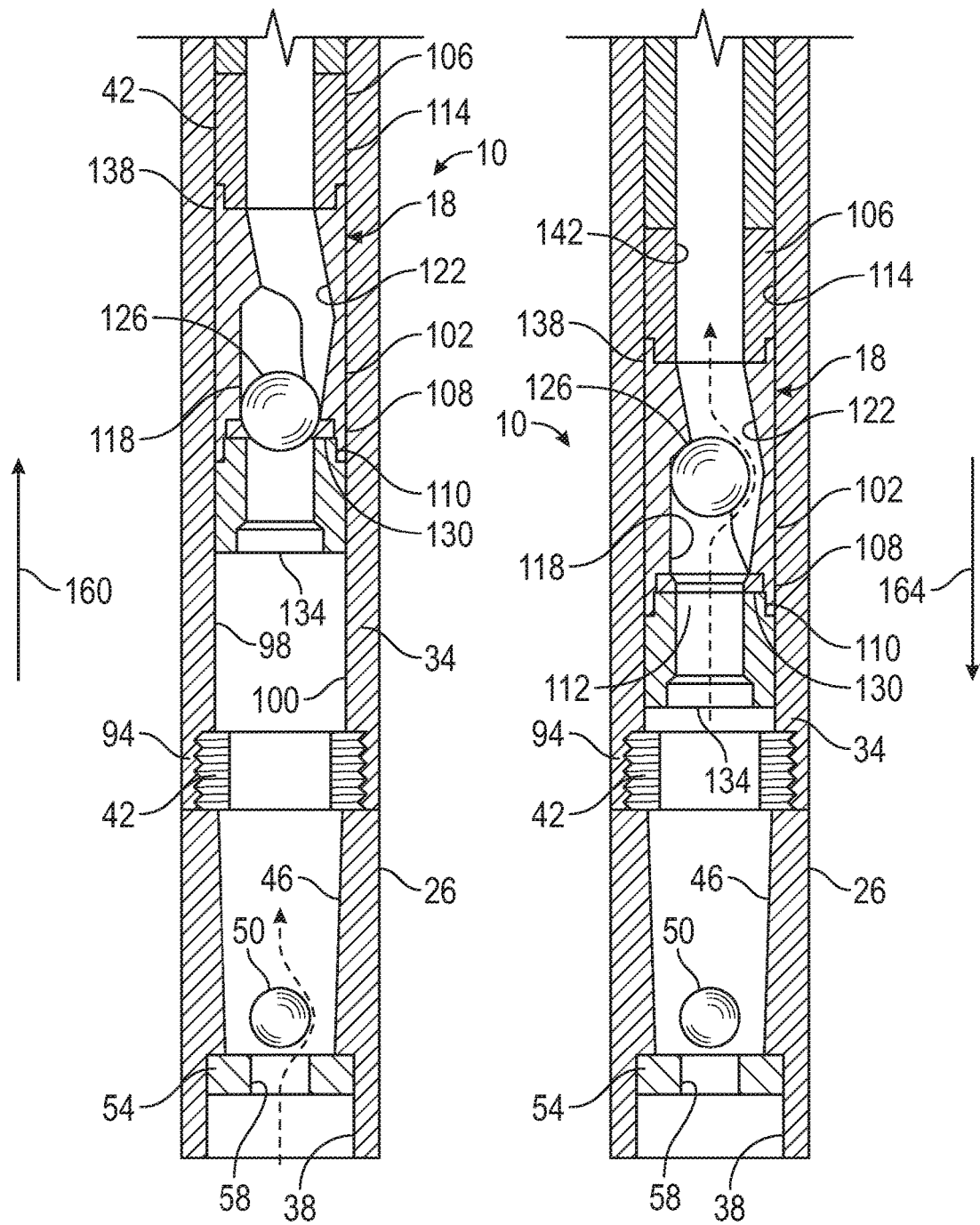
FIG. 1 is a cross-sectional view of one embodiment of a downhole pump, illustrated during an upstroke and constructed in accordance with the inventive concepts disclosed herein.
FIG. 2 is a cross-sectional view of the downhole pump of FIG. 1, illustrated during a downstroke.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. The inventive concepts disclosed herein are capable of other embodiments, or of being practiced or carried out in various ways. Also, it is to be understood that the phraseology and terminology employed herein is for the purpose of description and should not be regarded as limiting the inventive concepts disclosed and claimed herein in any way.

In the following detailed description of embodiments of the inventive concepts, numerous specific details are set forth in order to provide a more thorough understanding of the inventive concepts. However, it will be apparent to one of ordinary skill in the art that the inventive concepts within the instant disclosure may be practiced without these specific details. In other instances, well-known features have not been described in detail to avoid unnecessarily complicating the instant disclosure.

As used herein, the terms "comprises," "comprising," "includes," "including," "has," "having," and any variations thereof, are intended to cover a non-exclusive inclusion. For example, a process, method, article, or apparatus that comprises a list of elements is not necessarily limited to only those elements, and may include other elements not expressly listed or inherently present therein.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B is true (or present).

In addition, use of the "a" or "an" are employed to describe elements and components of the embodiments disclosed herein. This is done merely for convenience and to give a general sense of the inventive concepts. This description should be read to include one or at least one and the singular also includes the plural unless it is obvious that it is meant otherwise.

As used herein, qualifiers like "substantially," "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Referring now to the drawings, and more particularly to FIGS. 1 and 2, a downhole pump 10 is shown constructed in accordance with one embodiment of the presently disclosed inventive concepts. It should be noted that the downhole pump 10 may also be described herein as a put pump 10, or simply a pump 10. The pump 10 is secured in a tubing (not shown) and used with a pump jack unit (not shown) for elevating fluids, such as hydrocarbons, to the earth's surface. In the embodiment shown in FIGS. 1 and 2, the pump 10 is provided with a body assembly 14, a plunger assembly 18 slidably disposed within at least a portion of a pump barrel 34 and mechanically actuated by a sucker rod string (not shown), and a standing valve 26.

The standing valve 26 may be cylindrical in shape and may be formed with a first end 38, a second end 42 adapted to securely engage the pump barrel 34, and a channel 46 extending between the first end 38 and the second end 42. The standing valve 26 further includes a spherical valve member 50 sized to fit within the channel 46, and a valve seat 54 securely disposed within a portion of the channel 46, so as to prevent the valve member 50 from passing through the first end 38 of the standing valve 26. The valve seat 54 is provided with an aperture 58 formed such that when the valve member 50 engages, and seats on, the valve seat 54, the aperture 58 is substantially sealed by the valve member 50 (as shown in FIG. 2). Conversely, when the valve member 50 is disposed away from the valve seat 54, fluid is permitted to flow through the aperture 58 of the valve seat 54 (as shown in FIG. 1), and into the channel 46.

The standing valve 26 depicted is only one example of a standing valve 26 which may be utilized with the pump 10 of the present invention. Thus, valves with similar function may be substituted and interchanged with the standing valve 26 so long as the substituted valve is suitable to permit functioning of the pump 10. More specifically, when there is a negative pressure gradient from the channel 46 across the valve seat 54, the valve member 50 moves away from the valve seat 54 such that fluids may flow through the aperture 58 of the valve seat 54 to bypass the valve member 50 and flow through the standing valve 26.

The pump barrel 34 may be sized and shaped to securely engage the second end 42 of the standing valve 26. In the embodiment shown in FIGS. 1 and 2, the pump barrel 34 is provided with a first end 94 adapted to securely engage the second end 42 of the standing valve 26, a second end (not shown), and a plunger channel 98 extending between the first end 94 and the second end, the plunger channel 98 shaped and sized to slidably receive the plunger assembly 18.

The first end 94 of the pump barrel 34 may securely engage the second end 42 of the standing valve 26, for instance, via corresponding threads. In other embodiments, the first end 94 of the pump barrel 34 and the second end 42 of the standing valve 26 may be connected by any suitable means such as, for example, corresponding tabs and slots, welds, adhesives, press-fitting, threaded connection or the like.

As shown in FIGS. 1 and 2, when the standing valve 26 and pump barrel 34 are securely joined or connected to form the body assembly 14; the channel 46 of the standing valve 26 and the plunger channel 98 of the pump barrel 34 cooperate to define a pump chamber 100, between the valve seat 58 of the standing valve 26 and the plunger assembly 18.

In one embodiment of the presently disclosed inventive concepts, the plunger assembly 18 may be provided with a traveling valve 102, a valve seat 130, and a plunger body 106.

The traveling valve 102, which may also be referred to herein as bypass valve 102, may be provided with a valve body 108 sized and shaped to fit closely within the plunger channel 98 of the pump barrel 34. The valve body 108 of the traveling valve 102 may be provided with a first end 110 having an inlet 112 formed therethrough, a second end 114 adapted to securely engage the plunger body 106, a valve channel 118 extending inward from the inlet 112 and terminating within the valve body 108, and an outlet channel 122 extending from the valve channel 118 and/or the inlet 112 to the second end 114. The bypass valve 102 is further provide with a spherical valve member 126 sized to fit within the valve channel 118 and engage the valve seat 130 in a way to prevent the valve member 126 from passing through the first end 110 of the valve body 108. The valve seat 130 is provided with an aperture 134 formed such that when the valve member 126 engages, and seats on, the valve seat 130 (FIG. 1), the aperture 134 is substantially sealed by the valve member 126. Conversely, when the valve member 126 is disposed away from the valve seat 130 towards the opposite end of the valve channel 118 (FIG. 2), fluid is permitted to flow through the aperture 134 of the valve seat 130, past the valve member 126, and through the outlet channel 122, to exit the valve body 108.

The bypass valve 102 depicted is only one example of a traveling valve 102 which may be utilized with the pump 10 of the present invention. In other embodiments of the pump 10, other embodiments of the traveling valve 102 may be utilized that perform the essential function of the bypass valve 102 as will be described further herein. More specifically, when there is a negative pressure gradient from the outlet channel 122 across the valve seat 130, the valve member 126 moves away from the valve seat 130 such that fluids may flow through the aperture 134 of the valve seat 130 to bypass the valve member 126 and flow through the traveling valve 102. Thus, valves with similar function may be substituted and interchanged with the traveling valve 102, so long as the substituted valve is suitable to permit functioning of the pump 10.

The plunger body 106 is formed having a shape and size to correspond with the traveling valve 102. The plunger body 106 is further formed with a first end 138 adapted to securely engage the second end 114 of the traveling valve 102, a second end (not shown), and a fluid passage 142 extending from the first end 138 towards the second end (not shown). In the embodiment shown in FIGS. 1 and 2, the first end 138 of the plunger body 106 connects to the second end 114 of the traveling valve 102 via corresponding threads. In other embodiments, the first end 138 of the plunger body 106 and the second end 114 of the traveling valve 102 may be connected by any suitable means, for example, corresponding tabs and slots, welds, adhesives, press-fitting, threaded connection or the like. The fluid passage 142 provides a flow path for fluids to flow from the first end 138 toward the second end of the plunger body 106.

Various embodiments of the plunger body 106 may be implemented with the pump 10 of the present invention. For example, in one embodiment, the second end of the plunger body 106 is provided with a plurality of fluid ports or valves (not shown), such that the liquid or other fluid is ejected from within fluid passage 142, through the plunger body 106, past the pump barrel 34, and into the tubing (not shown) to be intermingled with the fluids ejected from discharge valve 30. In other embodiments, the second end (not shown) of the plunger body 106 may be adapted to connect to a hollow sucker rod (not shown), such that a portion of the fluid may be lifted or forced to the surface within the hollow sucker rod (not shown). Various valves, hollow sucker rods, and the like are well known in the art, and no further description thereof is deemed necessary for one skilled in the art to implement the two exemplary embodiments of the plunger body 102, or the various other embodiments of the plunger body 102 which may be utilized with the present invention.

In operation, the pump 10 functions as follows. As best shown in FIG. 1, the plunger assembly 18 is mechanically actuated in an upward direction 160, which may also be referred to as an upstroke. As the plunger assembly 18 moves in the upward direction 160, the valve member 126 of the bypass valve 102 is forced downward into a first position adjacent to the valve seat 130 to seal the aperture 134 by gravity and/or hydrostatic pressure of fluid within the outlet channel 122 of the bypass valve 102 and/or within the fluid passage 142 of the plunger body 106. Thus, the motion of the plunger assembly 14 in the first direction 160 causes a negative pressure gradient across the aperture 58 of the standing valve 26. This negative pressure gradient draws the valve member 50 of the standing valve 26 away from the valve seat 54 to open the standing valve 26 and permit fluid to be drawn through the aperture 58 of the standing valve 26 and into the valve chamber 100.

Once the plunger assembly 14 reaches the apex of the upstroke, and as best shown in FIG. 2, the plunger assembly 14 is mechanically actuated in a downward direction 164, which may also be referred to as a downstroke. As the plunger assembly 18 moves in the downward direction 164, the valve member 126 of the bypass valve 102 is forced upward into a second position away from the valve seat 130 to open the aperture 134 by the pressure of the fluid within the valve chamber 100. More specifically, the downstroke creates a negative pressure gradient across the bypass valve 102, in that the pressure within the bypass valve 102 is less than the pressure on the outer side of the inlet 112 of the bypass valve 102. Thus, the motion of the plunger assembly 14 in the second direction 164 causes a positive pressure gradient across the aperture 58 of the standing valve 26. This pressure gradient pushes the valve member 50 of the standing valve 26 to engage the valve seat 54 to close the standing valve 26 and thereby push fluid out of the valve chamber 100 through aperture 134 of the bypass valve 102.

In one embodiment, the second end (not shown) of the plunger body 106 is provided with one or more of fluid ports and/or valves (not shown), such that the liquid or other fluid is ejected from within fluid passage 142, through the plunger body 106, past the pump barrel 34, and into the tubing (not shown). Thus, the fluid passing through the bypass valve 102 further adds to the volume of fluid within the tubing (not shown) to further raise the level of fluid within the tubing and thereby cause the fluid to rise to the surface, where it can be extracted from the well. As will be appreciated by those skilled in the art, this permits fluid to be extracted from the well without requiring the sucker rod to support the weight of a fluid column, such as in other types of pumps which mechanically lift the fluid to the surface with the plunger.

As will be appreciated by those skilled in the art, once the plunger assembly 18 reaches the end of the downstroke, the plunger assembly 18 is once again reversed and mechanically actuated in the upward direction 160 for a subsequent upstroke, wherein alternating upstrokes and downstrokes, respectively, may be sequentially repeated to extract fluid from a well.

Figure 3:
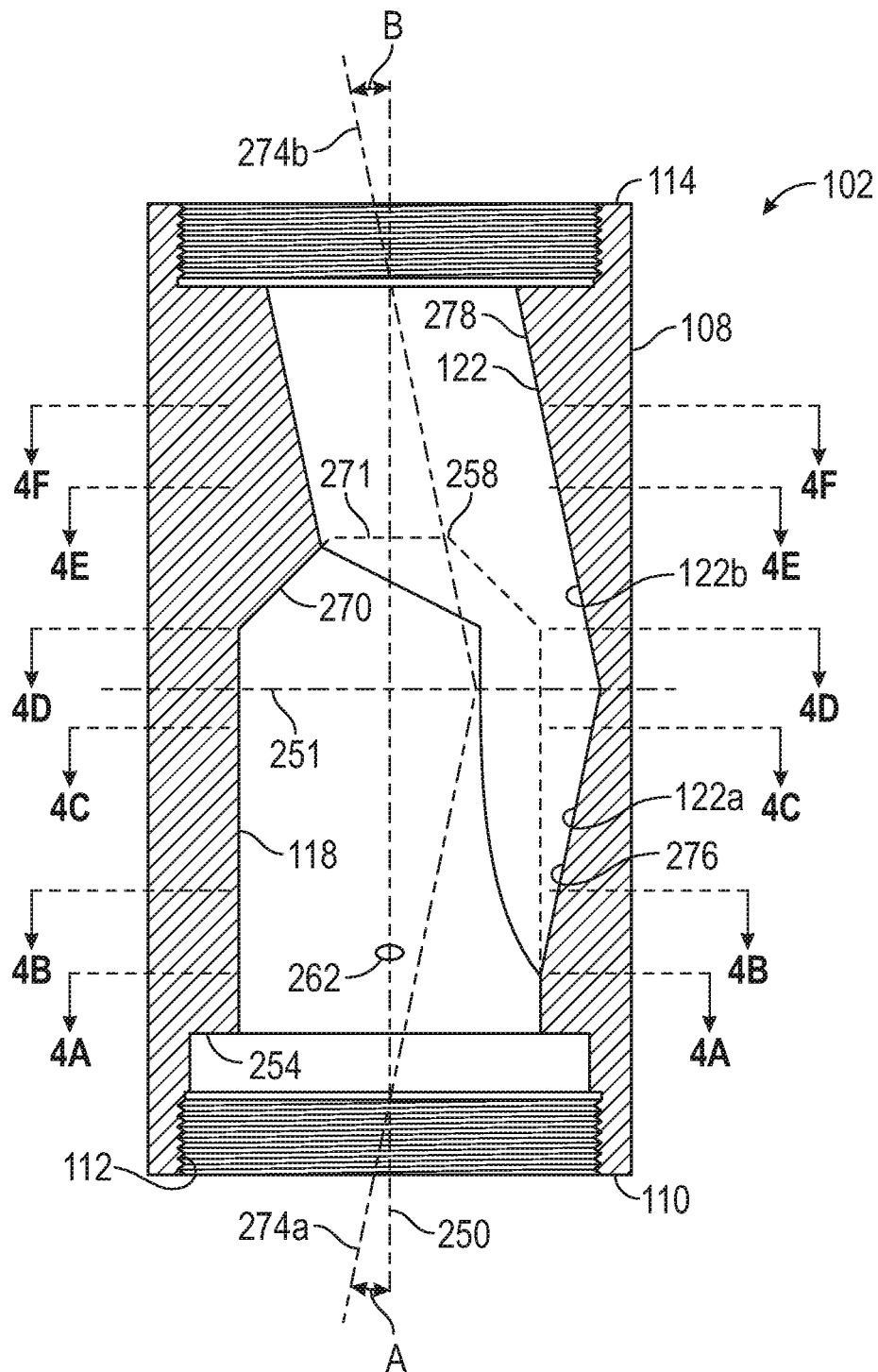
FIG. 3 is a cross-sectional view of one embodiment of a bypass valve constructed in accordance with the inventive concepts disclosed herein and suitable for use with the downhole pump of FIGS. 1 and 2.

Referring now to FIG. 3, a cross-sectional view of the bypass valve 102 is shown to facilitate a more complete description and understanding of the novel features and functions of the bypass valve 102. As described above, the bypass valve 102 is provided with a valve body 108 formed with a first end 110 having an inlet 112 formed therethrough, a second end 114, a valve channel 118 in fluid communication with the inlet 112 and extending inward to terminate within the valve body 108, and an outlet channel 122 in fluid communication with the valve channel 118 and/or the inlet 112 and extending to the second end 114 of the valve body 108. In the embodiment shown in FIG. 3, the bypass valve 102 is provided with a central axis 250 extending between the first end 110 and the second end 114 of the valve body 108.

The valve channel 118 of the bypass valve 102 is provided with a first end 254, a second end 258, and a valve channel axis 262 extending therebetween. As shown in FIG. 3, the valve channel axis 262 is axially aligned with the central axis 250. The valve channel 118 is formed with a circular cross-section defined about the valve channel axis 262. In other embodiments, the valve channel 118 may be formed with any suitable cross-section to enable the function described herein.

In one embodiment, the second end 258 of the valve channel 118 is multi-faceted. In the embodiment shown in FIG. 3, the second end 258 is provided having a first facet 270 and a second facet 271. The first facet 270 forms a conical section at the second end 258 so as to minimize the surface area of the first facet 270 that is contacted by the valve member 126 when the valve member 126 is adjacent to the second end 258 of the valve channel 118. This reduces the likelihood of the valve member 126 sticking in the second position due to vapor lock or the like preventing the valve member 126 from freely moving within the valve channel 118. In the embodiment shown in FIG. 3, the first facet 270 has a predetermined width and forms an absolute angle of substantially 45 degrees relative to the central axis 250 of the bypass valve 102 and the second facet 271 forms an absolute angle of substantially 0 degrees relative to the central axis 250. It should be understood, however, that the multi-faceted portion of the second end 258 may be formed on between two facets and ten facets so long as the risk of sticking is reduced due to a reduction in surface contact between any facet or facets of the second end 258 and the surface of the valve member 126 is sufficiently reduced. In another embodiment, the first facet 270 is tangent to a spherically-rounded segment of the second end 258 (not shown).

In the embodiment shown in FIG. 3, the outlet channel 122 comprises a first outlet channel segment 122a and a second outlet channel segment 122b. In such an embodiment, the first outlet channel segment 122a forms a first bore 276 having a predetermined shape extending from the first end 112 of the valve body 108 to the horizontal axis 251. The first bore 276 of the outlet channel segment 122a has a central axis 274a having a first predetermined angle A relative to the central axis 250. The first predetermined angle A may range from an absolute angle of about 10 degrees to an absolute angle of about 17 degrees.

The second outlet channel segment 122b forms a second bore 278 having a predetermined shape extending from the horizontal axis 251 to the second end 114 of the valve body 108. The second bore 278 of the outlet channel segment 122b has a central axis 274b having a second predetermined angle B relative to the central axis 250. The second predetermined angle B may range from an absolute angle of about 5 degrees to an absolute angle of about 25 degrees.

In embodiments of the bypass valve 102, the angles A and B may be adjusted, for instance, depending on a length of the valve body 108, the size of the valve channel 118, both length and diameter, the location of the valve channel 118 relative to the central axis 250, and the type of fluid to be pumped.

Although the valve channel 118 has been shown having a length such that an axis (not shown) passing horizontally through a center of the valve member 126 as it is in the second position is substantially co-linear with a vertex of the first outlet channel segment 122a and the second outlet channel segment 122b which substantially co-linear with the horizontal axis 251 of the bypass valve 102, it should be noted that the length of the valve channel 118 may altered, for instance, to optimize fluid flow, or minimize damage. More specifically, the longer the valve channel 118 is the greater velocity with which the valve member 126 will strike the second end 258 when the bypass valve 102 opens. Such increased velocity increases wear on the valve channel 118, the first facet 270, and the valve member 126, effectively reducing the service life of the bypass valve 102. Conversely, however, if the length of the valve channel 118 is too short, the valve member 126 may not be permitted to move far enough to permit fluid to flow at sufficient rates around the valve member 126 and through the outlet channel 122.

As will be appreciated by a person of skill in the art, the angles A and B of the outlet channel 122a and 122b as well as the length of valve channel 118 may be optimized, both individually and relative to one another, to reduce wear and extend service life as well as to maximize flow characteristics of the bypass valve 102. For ease of description, the length of the valve channel 118 may be expressed in terms of the diameter of the spherical valve member 126. In one embodiment, the length of the valve channel 118 may be between substantially 1.5 and substantially 2 times the diameter of the spherical valve member 126, and may be between substantially 1.01 and substantially 1.1 times the diameter of the valve member 126.

As will be appreciated by those skilled in the art, the geometry of the bypass valve 102 described above results in improved flow characteristics by channeling fluids and some solids through a single, smooth outlet channel 122. As best shown in FIG. 3, the angular disposition of the outlet channel segments 122a and 122b relative to the valve channel 118 causes the valve member 126 to move in axial alignment with the valve seat 130 and the valve channel 118, permitting the outlet channel 122 to direct fluid smoothly around the valve member 126 in a single flow path with minimal turbulence-induction. Such geometry is achieved by forming the valve body 102 with known casting methods, as such casting methods have proven to permit easier formation of the particularly novel geometry of the valve body 108 described above. However, in other embodiments, the geometry of the valve body 102 may be achieved by any known methods, such as, for example, machining, forging, or the like.

Figure 4A:
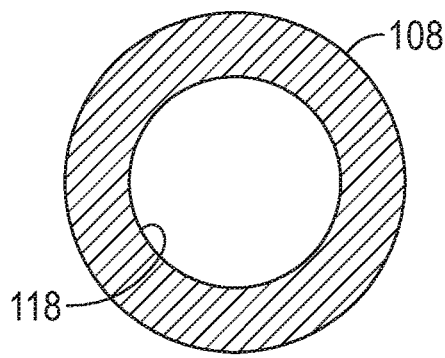
FIGS. 4A-4F are cross sectional views of the bypass valve of FIG. 3.

Referring now to FIGS. 4A-4F, shown therein are horizontal cross section views taken at various levels of the bypass valve 102 shown in FIG. 3. In FIGS. 4A-4F the valve member 126 is shown in the second position. Or, in other words, the bypass valve 102 is open. In FIG. 4A, the valve channel 118 is shown axially aligned with the central axis 250 (not indicated in FIG. 4A) of the valve body 108. The valve channel 118 is sized to maximize fluid communication between valve channel 118 and outlet channel 122, while also preventing the valve member 126 from passing from the valve channel 118 to the outlet channel 122. At this level in the valve body, the outlet channel 122 is substantially aligned with the valve channel 118 and so outlet channel 122 is not indicated in FIG. 4A.

Figure 4B:
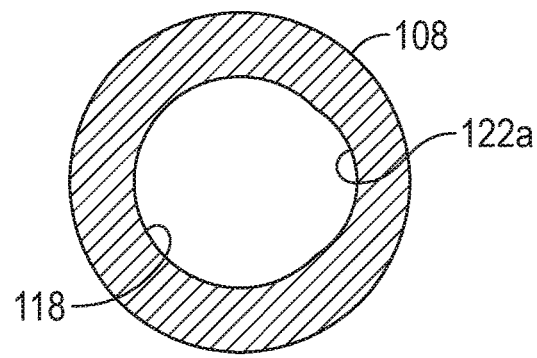

Moving up to the level shown in FIG. 4B, the outlet channel segment 122a of the outlet channel 122 can now be seen. The valve channel 118 remains axially aligned with the central axis 250 of the valve body 108 but the angle of the outlet channel segment 122a indicated by angle A (not indicated in FIG. 4A) causes the outlet channel segment 122a to begin to offset from the valve channel 118.

Figure 4C:
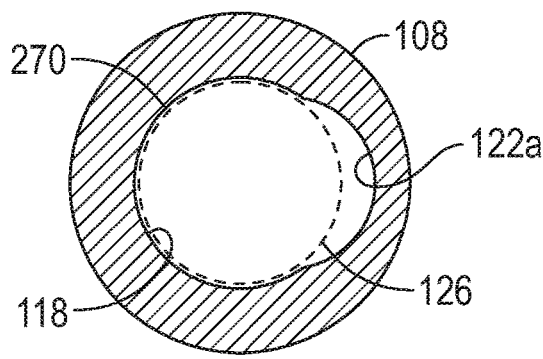

In FIG. 4C, the valve member 126 is shown axially aligned with the valve channel 118. At this level, a lower portion of the valve member 126 can be seen. Because the valve member 126 is in the second or open position, the outlet channel segment 122a is open for fluid to flow around the valve member 126.

Figure 4D:
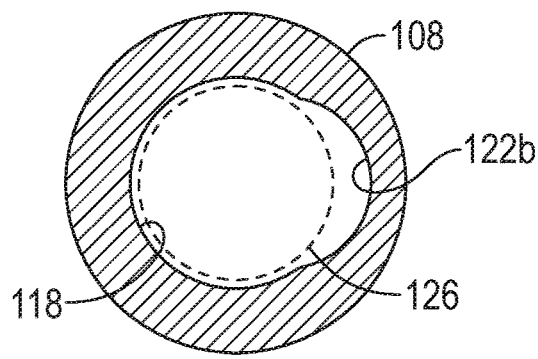

As shown in FIG. 3, the level of FIG. 4D is above the horizontal axis 251, thus the outlet channel segment 122b is shown. It should be noted that the valve member 126 is not in contact with the valve channel 118 at this level because the first facet 270 of the second end 258 of the valve channel 118 ensures that there is only minimal contact between the valve member 126 and the valve channel 118, even in the open position. As will be appreciated by a person of skill in the art, the outlet channel segment 122b begins to angle back toward the central axis 250 of the valve body 108 though the cross-section of the fluid path remains substantially the same.

Figure 4E:
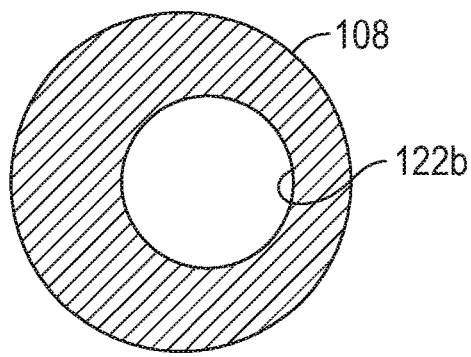
Figure 4F:
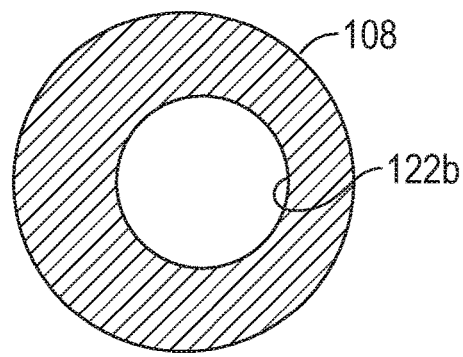

In FIG. 4E, a portion of the valve body 108 that is above the second end 258 of the valve channel 118 is shown, thus only the outlet channel segment 122b is indicated. FIG. 4F further illustrates the path of the outlet channel segment 122b as it can be seen to move closer to being aligned with the central axis 250 of the valve body 108. Though not illustrated in FIGS. 4A-4F, it should be noted that the central axis 274b of the outlet channel segment 122b aligns with the central axis 250 of the valve body 108 before the second end 114 at which point the outlet channel 122 extends through the second end 114 of the valve body 108 axially aligned with the central axis 250 of the valve body 108.

As described above in general terms, the valve member 126 is disposed within the valve channel 118 such that the valve member 126 is freely movable between the first position (FIG. 1) closing the bypass valve 102 and the second position (FIG. 2) opening the bypass valve 102. When the valve member 126 is disposed in the first position, the valve member 126 engages the valve seat 130 so as to substantially seal the aperture 134 through the valve seat 130. When the valve member 126 is disposed in the second position, the valve member 126 engages the first facet 270 of the second end 258 valve channel 118 so as to permit fluids and solids to flow through the aperture 134 of the valve seat 130 and out the outlet channel 122 of the valve body 108. As will be appreciated by a person of skill in the art, because the central valve channel axis 262 is substantially coaxial with the central axis 250 of the bypass valve 102, the valve member 126 travels in a substantially straight path between the first position and the second position, thus minimizing contact with the valve channel 118 which, in turn, minimizes wear on the valve channel 118 and the valve member 126. This can be contrasted with prior-art valves.

Figure 5:
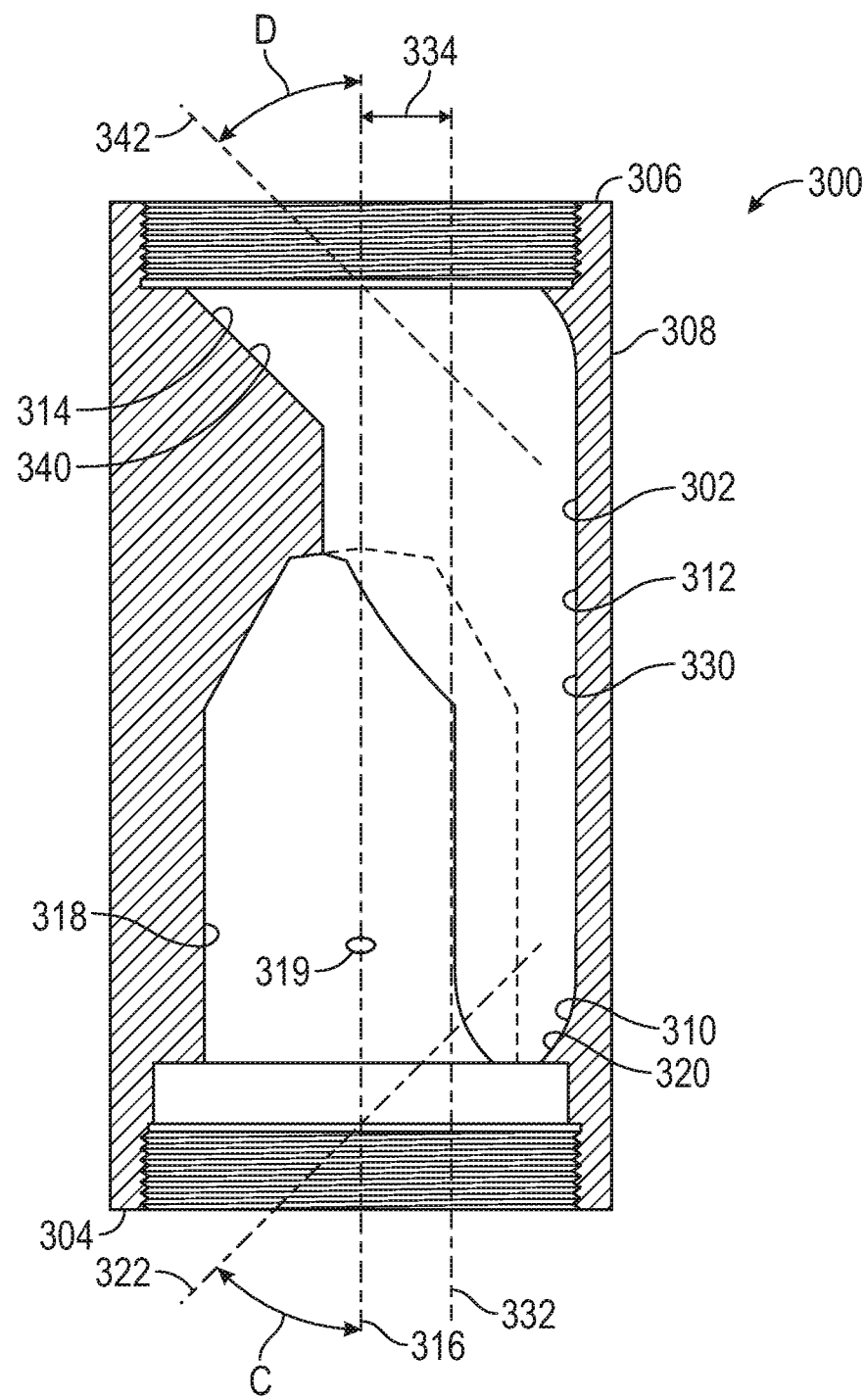
FIG. 5 is a cross-sectional view of another embodiment of a bypass valve constructed in accordance with the inventive concepts disclosed herein and suitable for use with the downhole pump of FIGS. 1 and 2.

Referring now to FIG. 5, shown therein is a bypass valve 300 constructed in accordance with one embodiment of the inventive concepts disclosed herein. The bypass valve 300 is similar to the bypass valve 102 described above. Therefore, in the interest of brevity, only the features of the bypass valve 300 that are different from those described with reference to bypass valve 102 will be described with reference to FIG. 5.

In the embodiment shown in FIG. 5, the bypass valve 300 is provided with an outlet channel 302 extending from a first end 304 to a second end 306 of a valve body 308 of the bypass valve 300. In this embodiment, the outlet channel 302 comprises a first segment 310, a second segment 312, and a third segment 314. The bypass valve 300 is further provided with a valve channel 318 having a central valve channel axis 319 which is coaxial with a central axis 316 of the bypass valve 300.

The first segment 310 of the bypass valve 300 is provided with a first bore 320 having a central axis 322. The first bore 320 of the first segment 310 extends from the first end 304 to a second bore 330 of the second segment 312. The central axis 322 of the first segment 310 is formed at an angle C relative to the central axis 316 of the bypass valve 300. In the embodiment shown, the angle C is equal to an absolute angle of substantially 45 degrees. It should be noted, however, that the bypass valve 300 may be provided having an angle C that is anywhere between an absolute angle of substantially 20 degrees and an absolute angle of substantially 70 degrees.

The second segment 312 of the outlet channel 302 is provided with the second bore 330 having a central axis 332. The second bore 330 is in fluid contact with the first bore 320 and extends to a third bore 340 of the third segment 314. The central axis 332 of the second segment 312 is substantially parallel to the central axis 316 of the bypass valve 300. The central axis 332 of the second segment is offset for the central axis 316 by a predetermined distance 334.

The third segment 314 of the bypass valve 300 is provided with the third bore 340 having a central axis 342. The third bore 340 of the third segment 314 is in fluid contact with the second bore 330 and extends through the second end 306 of the bypass valve 300. The central axis 342 of the third segment 314 is formed at an angle D relative to the central axis 316 of the bypass valve 300. In the embodiment shown, the angle D is equal to an absolute angle of substantially 45 degrees. It should be noted, however, that the bypass valve 300 may be provided having an angle D that is anywhere between an absolute angle of substantially 20 degrees and an absolute angle of substantially 70 degrees.

As will be appreciated by a person of skill in the art, offsetting the second segment 312 of the outlet channel 302 allows for more fluid flow through the bypass valve 300 as the fluid flow reaches maximum flow before the valve member 126 reaches a second end (not indicated) of the valve channel 318. In addition, because the fluid flow reaches maximum earlier, the velocity of the valve member 126 is not as great when it reaches the second end of the valve channel 318. Thus, wear on the valve channel 318 and the valve member 126 is further reduced while maintaining a desired fluid flow.

Figure 6:
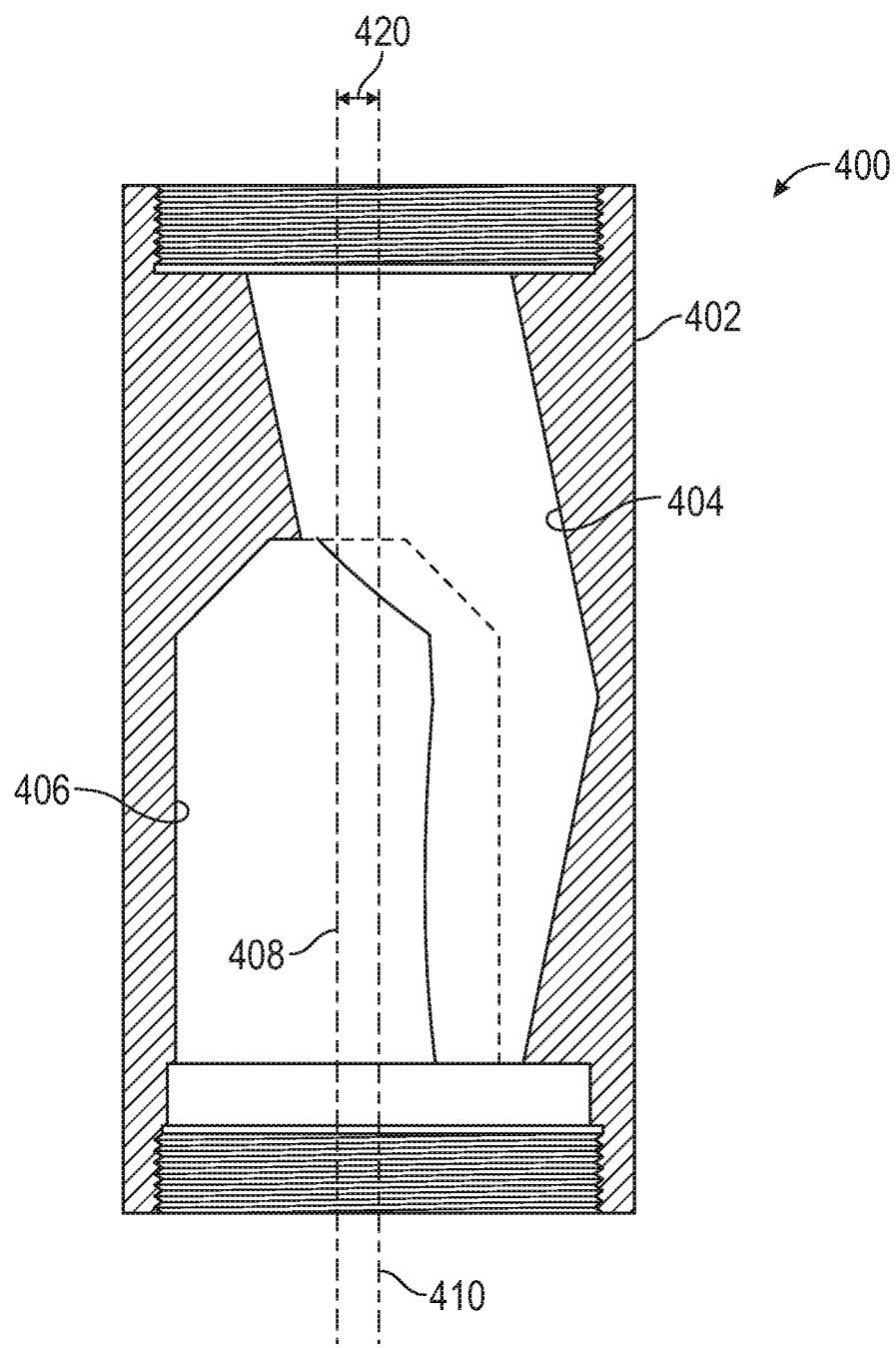
FIG. 6 is a cross-sectional view of another embodiment of a bypass valve constructed in accordance with the inventive concepts disclosed herein and suitable for use with the downhole pump of FIGS. 1 and 2.

Referring now to FIG. 6, shown therein is a cross-sectional view of a bypass valve 400 constructed in accordance with one embodiment of the inventive concepts disclosed herein. The bypass valve 400 is similar to the bypass valve 102 described above. Therefore, in the interest of brevity, only those features which are different will be described herein.

The bypass valve 400 is provided with a valve body 402, an outlet channel 404, a valve channel 406, a valve channel axis 408, and a central axis 410. In the embodiment shown in FIG. 6, the valve channel 406 is offset from the central axis 410 by a predetermined distance 420 between the central axis 410 and the valve channel axis 408. In such an embodiment, the valve member 126 is coaxially disposed with the valve channel axis 408 and travels substantially parallel to the central axis 410. Because the valve channel axis 408 is offset from the central axis 410, the outlet channel 404 is provided with a larger maximum opening for improved fluid flow. In addition, fluid is allowed to pass around the valve member 126 sooner, which results in less velocity as the valve member 126 moves between the first position and the second position. Thus, wear on the valve channel 406 and the valve member 126 is achieved.

Figure 7:
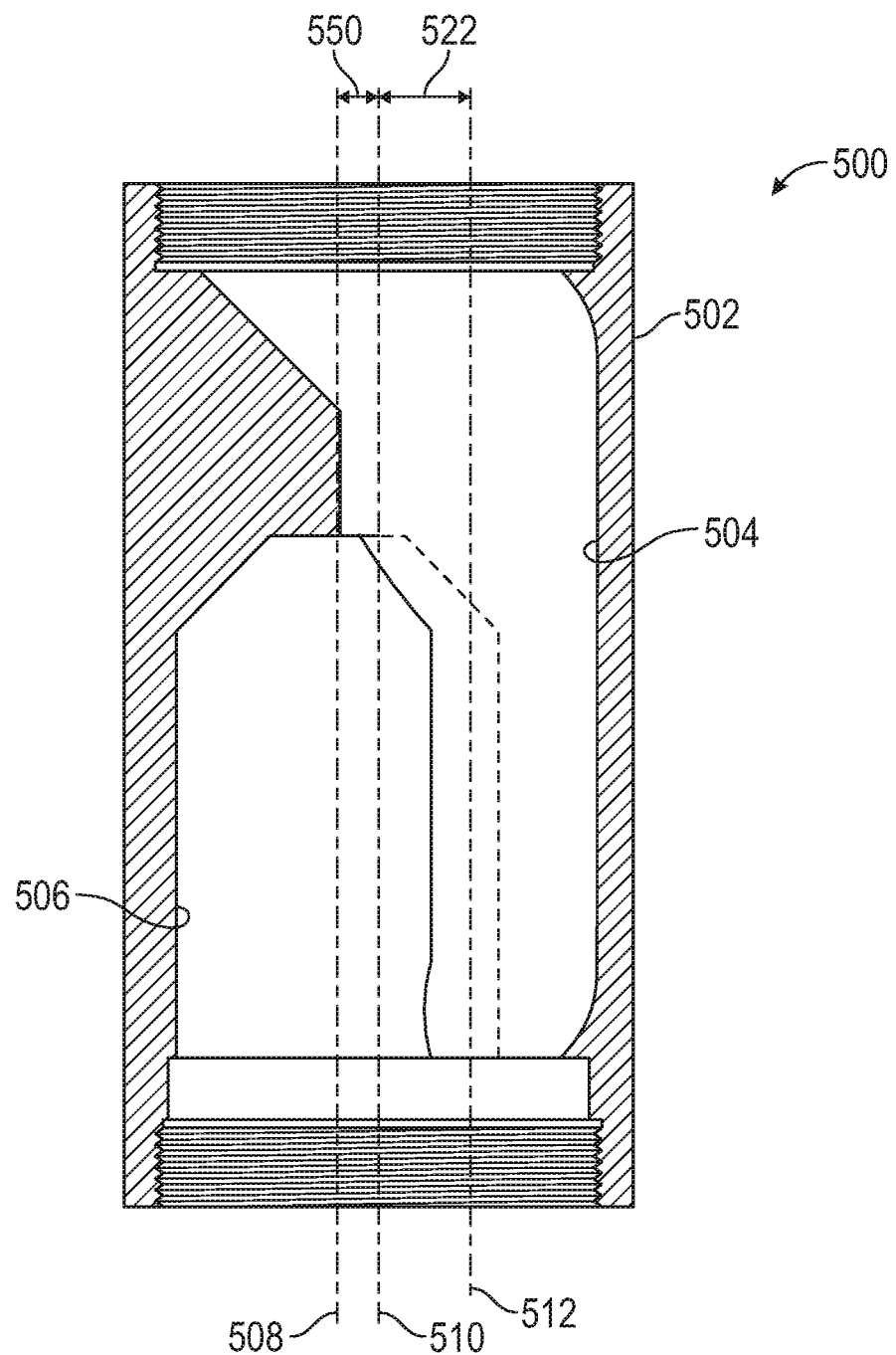
FIG. 7 is a cross-sectional view of another embodiment of a bypass valve constructed in accordance with the inventive concepts disclosed herein and suitable for use with the downhole pump of FIGS. 1 and 2.

Referring now to FIG. 7, shown therein is a cross-sectional view of a bypass valve 500 constructed in accordance with one embodiment of the inventive concepts disclosed herein. The bypass valve 500 is similar to the bypass valve 300 described above. Therefore, in the interest of brevity, only those features which are different will be described herein.

The bypass valve 500 is provided with a valve body 502, an outlet channel 504, a valve channel 506, a valve channel axis 508, a central axis 510, and an outlet channel axis 512. In the embodiment shown in FIG. 7, the valve channel 506 is offset from the central axis 510 by a predetermined distance 520 between the central axis 510 and the valve channel axis 508 and the outlet channel axis 512 is offset a predetermined distance 522 between the outlet channel axis 512 and the central axis 510. In such an embodiment, the valve member 126 is coaxially disposed with the valve channel axis 508 and travels substantially parallel to the central axis 510. Because the valve channel axis 508 and the outlet channel axis 512 are offset from the central axis 510, the outlet channel 504 is provided with a larger maximum opening for improved fluid flow. In addition, fluid is allowed to pass around the valve member 126 sooner, which results in less velocity as the valve member 126 travels between the first position and the second position. Thus, wear on the valve channel 506 and the valve member 126 is achieved.

From the above description, it is clear that the inventive concepts disclosed and claimed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and/or as defined in the appended claims.

What is claimed is:

1. A bypass valve, comprising:
a one-piece valve body having a first end, a second end, and a central axis therebetween, the valve body further having an inlet, a valve channel, and an outlet channel, the inlet formed through the first end of the valve body, the valve channel having a first end in fluid communication with the inlet, a second end terminating within the valve body, and a central valve channel axis axially offset from the central axis of the valve body, the outlet channel extending from an opening between the valve channel through the second end of the valve body, the opening between the valve channel and the outlet channel having a width less than the minimum internal dimension of the valve channel;
a substantially-spherical valve member disposed within the valve channel of the valve body, the valve member having a diameter sized to be movable within the valve channel along the central valve channel axis from the first end of the valve channel to the second end of the valve channel while being prevented from passing through the opening between the valve channel and the outlet channel of the valve body; and a valve seat disposed within the valve body and adjacent to the first end of the valve channel, the valve seat having a substantially-circular orifice defined therethrough, the orifice having a maximum internal dimension smaller than the diameter of the valve member;

wherein the valve member is movable between a first position engaging the valve seat and a second position adjacent to the second end of the valve channel, and wherein the valve member in the first position substantially seals the orifice in the valve seat so as to substantially prevent fluid from flowing between the inlet and either of a portion of the valve channel or the outlet channel, and wherein the valve member in the second position permits fluid to flow from the inlet to at least one of a portion of the valve channel or the outlet channel.

2. The bypass valve of claim 1, wherein the valve body and the valve member cooperate to define a single flow path from the inlet to the outlet channel.

3. The bypass valve of claim 2, wherein at least a portion of the flow path defined between the valve body and the valve member is at least partially reniform in cross section.

4. The bypass valve of claim 3, wherein the length of the valve channel along the central valve channel axis is between substantially 1.5 and substantially 2 times the diameter of the substantially-spherical valve member.

5. The bypass valve of claim 4, wherein the length of the valve channel along the central valve channel axis is substantially 1.75 times the diameter of the substantially-spherical valve body.

6. The bypass valve of claim 1, wherein at least a portion of the valve channel adjacent to the second end of the valve channel is conically shaped.

7. The bypass valve of claim 1, wherein the outlet channel comprises a first outlet channel segment and a second outlet channel segment, the first outlet channel segment being in fluid communication with the inlet and having a first predetermined angle relative to the central axis of the valve body, the second outlet channel segment being in fluid communication with the second end of the valve body and having a second predetermined angle relative to the central axis of the valve body, the first outlet channel segment and the second outlet channel segment meeting at a vertex, the vertex being substantially co-linear with an axis passing horizontally through a center of the substantially-spherical valve member as the substantially-spherical valve member is in the second position.

8. A bypass valve, comprising:

a one-piece valve body having a first end, a second end, and a central axis therebetween, the valve body further having an inlet, a valve channel, and an outlet channel, the inlet formed through the first end of the valve body, the valve channel having a first end in fluid communication with the inlet, a second end terminating within the valve body, and a central valve channel axis parallel with the central axis of the valve body, the central valve channel axis being offset a predetermined distance from the central axis of the valve body, the outlet channel extending from the valve channel through the second end of the valve body, the valve body further having an opening between the valve channel and the outlet channel such that the valve channel and the outlet channel are in fluid communication, the opening having a width less than the minimum internal dimension of the valve channel;

a substantially-spherical valve member disposed within the valve channel of the valve body, the valve member sized to be movable within the valve channel along the central valve channel axis from the first end of the valve channel to the second end of the valve channel while being prevented from passing through the opening between the valve channel and the outlet channel of the valve body; and a valve seat disposed within the valve body and adjacent to the first end of the valve channel, the valve seat having a substantially-circular orifice defined therethrough, the orifice having a maximum internal dimension smaller than the diameter of the valve member;

wherein the valve member is movable between a first position engaging the valve seat and a second position adjacent to the second end of the valve channel, and wherein the valve member in the first position substantially seals the orifice in the valve seat so as to substantially prevent fluid from flowing between the inlet and either of a portion of the valve channel or the outlet channel, and wherein the valve member in the second position permits fluid to flow from the inlet to at least one of a portion of the valve channel or the outlet channel.

9. The bypass valve of claim 8, wherein the valve body and the valve member cooperate to define a single flow path from the inlet to the outlet channel.

10. The bypass valve of claim 9, wherein at least a portion of the flow path defined between the valve body and the valve member is at least partially reniform in cross section.

11. The bypass valve of claim 8, wherein the length of the valve channel along the central valve channel axis is between about 1.65 and about 1.85 times the diameter of the substantially-spherical valve member.

12. The bypass valve of claim 11, wherein the length of the valve channel along the central valve channel axis is about 1.75 times the diameter of the substantially-spherical valve body.

13. The bypass valve of claim 8, wherein at least a portion of the valve channel adjacent to the second end of the valve channel is conically shaped.

\* \* \* \* \*